(12) United States Patent
Kurokawa

(10) Patent No.: US 7,869,829 B2
(45) Date of Patent: Jan. 11, 2011

(54) RADIO COMMUNICATION SYSTEM, INCLUDING A PLURALITY OF RADIO BASE STATIONS, RADIO BASE STATION, RADIO COMMUNICATION METHOD, AND COMPUTER READABLE MEDIUM FOR RADIO COMMUNICATION SYSTEM

(75) Inventor: Hideki Kurokawa, Tokyo (JP)

(73) Assignee: NEC Infrontia Corporation, Kawasaki, Kanagawa (JP)

( * ) Notice: Subject to any disclaimer, the term of this patent is extended or adjusted under 35 U.S.C. 154(b) by 970 days.

(21) Appl. No.: 11/723,195

(22) Filed: Mar. 16, 2007

(65) Prior Publication Data

US 2007/0218948 A1    Sep. 20, 2007

(30) Foreign Application Priority Data

Mar. 16, 2006   (JP)   ............................... 2006-073287

(51) Int. Cl.
*H04W 72/12* (2009.01)
(52) U.S. Cl. .................. 455/561; 455/524; 455/450; 370/338
(58) Field of Classification Search .................. None
See application file for complete search history.

(56) References Cited

U.S. PATENT DOCUMENTS 6,545,994 B2* 4/2003 Nelson et al. ............ 455/522 X

2005/0113128 A1* 5/2005 Bahl et al. .................. 455/522

FOREIGN PATENT DOCUMENTS

| JP | 2004-48356 | 2/2004 |
|---|---|---|
| JP | 2004-187297 | 7/2004 |

* cited by examiner

*Primary Examiner*—Philip J Sobutka
(74) *Attorney, Agent, or Firm*—McGinn IP Law Group, PLLC

(57) ABSTRACT

The present invention increases, even while transmission rights are not being allocated to respective radio communication terminals, a maximum number of simultaneous connections within a communication capacity range of a communication frequency set in advance, reduce a waiting time, and increase speed of communication without causing an increase in cost for addition of radio base stations, replacement with a high-performance model, and the like. A radio base station 2a calculates a guard time based on beacon transmission timing from a difference between reference times in beacon transmission, and transmission and reception time frame information based on beacon transmission timing of a radio base station 2b. In other words, the radio base station 2a calculates a guard time based on beacon transmission timing to prevent overlap of a transmission and reception time frame of transmission and reception to and from a radio communication terminal 3 belonging to the radio base station 2b, and transmission and reception timing of transmission and reception to and from a radio communication terminal 3 belonging to the radio base station 2a.

28 Claims, 4 Drawing Sheets

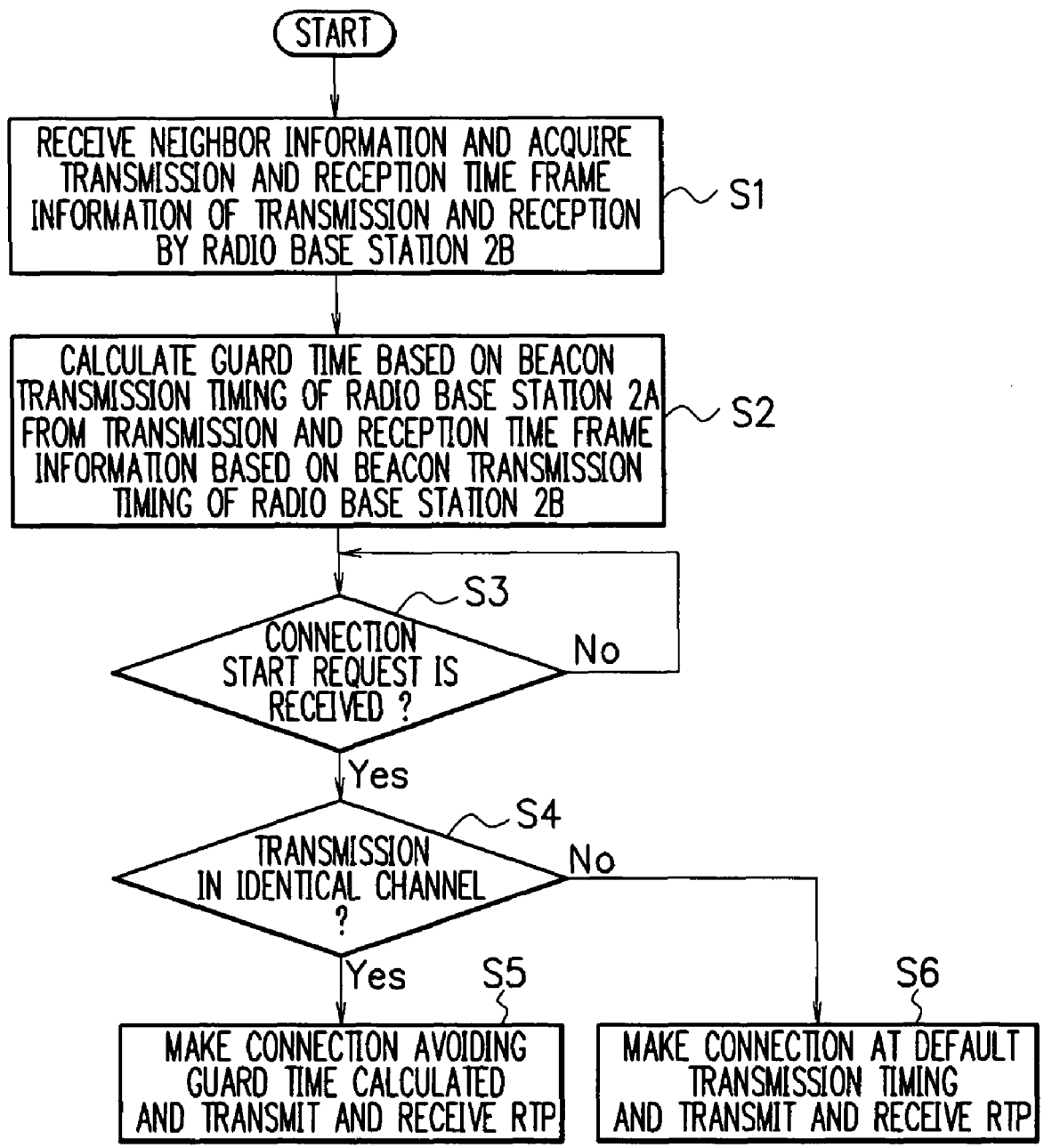

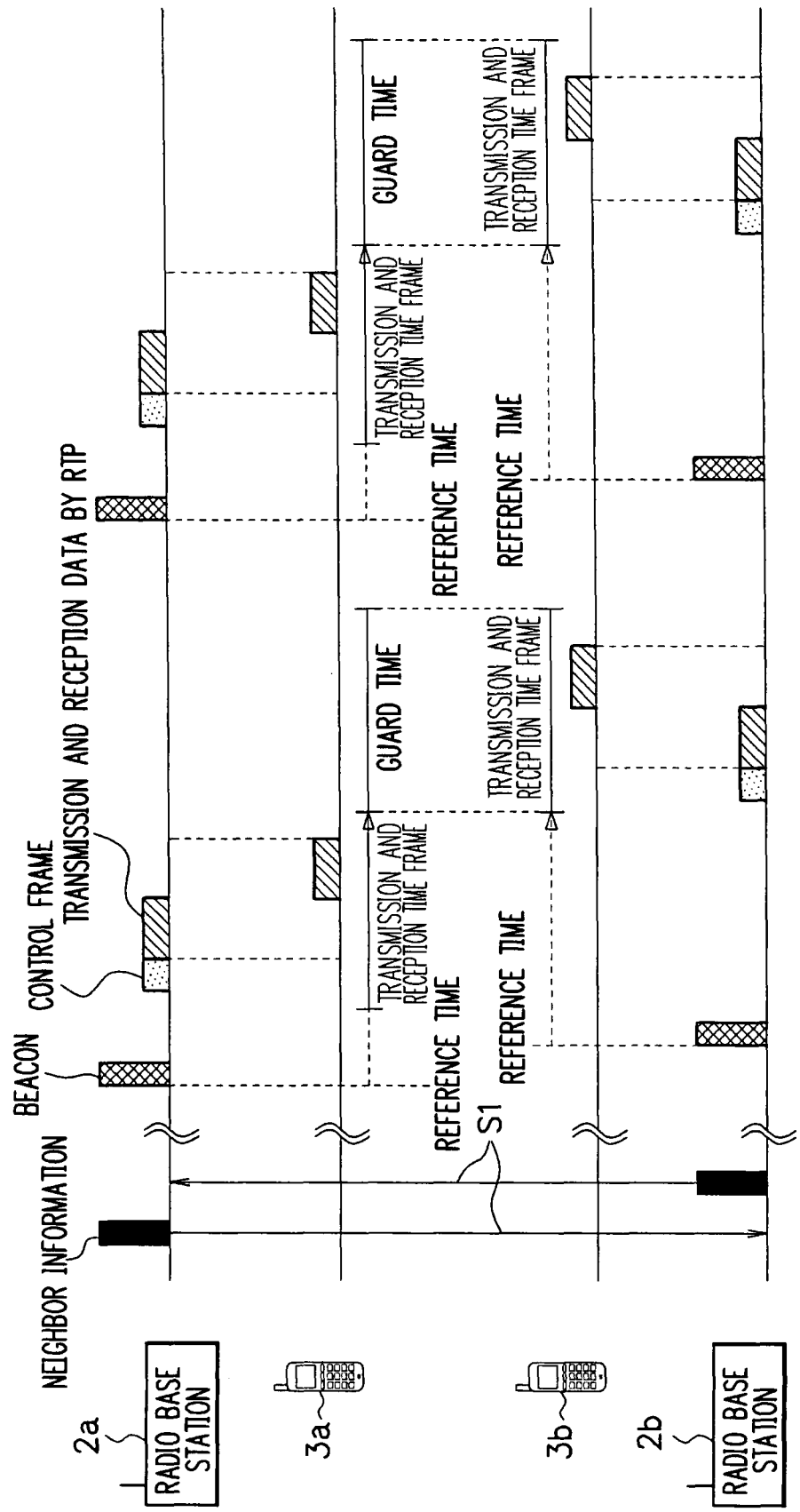

RADIO COMMUNICATION SYSTEM, INCLUDING A PLURALITY OF RADIO BASE STATIONS, RADIO BASE STATION, RADIO COMMUNICATION METHOD, AND COMPUTER READABLE MEDIUM FOR RADIO COMMUNICATION SYSTEM

BACKGROUND OF THE INVENTION

1. Field of the Invention

The present invention relates to a radio communication system including a plurality of radio base stations, a radio base station, a radio communication method, and a program for the radio communication system.

2. Description of Related Art

In general, in a radio communication system in which a radio section is half duplex such as a wireless network defined in the IEEE802.11 standard, when each of radio base stations transmits a frame, the radio base station needs to once check whether a medium (a communication tolerance in a communication band) is busy, i.e., whether frame transmission at a communication frequency can be done.

In such a radio communication system, when the radio base station detects presence of a transmission frame from another radio base station in a medium, the radio base station performing the transmission temporarily stops transmission processing and resumes the transmission processing after a predetermined waiting time passes.

In the Medium Access Control (MAC) in the IEEE802.11 wireless LAN, the Polling Coordination Function (PCF) and the Distributed Coordination Function (DCF) are prescribed as radio channel access methods.

In the PCF, usually, a radio base station sequentially allocates a transmission right to respective radio communication terminals. Since accesses to a radio channel are centrally controlled in this way, collision of frames does not occur in a Contention Free Period (CFP) in which the PCF works.

On the other hand, in the DCF, respective radio communication terminals acquire a transmission right for a radio channel in competition with one another. Since the respective radio communication terminals perform this transmission right acquisition competition in a distributed manner, collision of frames occurs in a Contention Period (CP) in which the DCF works.

As such a conventional radio communication system, there is a radio communication system in which, when interference occurs between two access points because the access points use communication channels of the same frequency band, an access point arbitrator gives permission for communication to one of the access points and puts the other access points on standby (see, for example, Japanese Patent Application Laid Open No. 2004-48356 (document 1)).

There is a radio communication system that uses scheduling information included in a scheduling information parameter set to decide time during which an access point functions as a point coordinator (see, for example, Japanese Patent Laid Open Publication No. 2004-187297 (document 2)).

However, the waiting time in the conventional radio communication system increases exponentially according to the number of times the medium is found busy at a point of transmission. Thus, even when a transmission frame itself is short, time required for transmission of one frame increases because of the waiting time, causing deterioration in transmission frame efficiency.

When the time required for transmission of one frame increases in this way, in the case of data communication, transmission speed of data falls and, in the case of voice communication, the number of simultaneous calls is decreased.

When it is attempted to increase the number of radio base stations or replace the radio base stations with a high-performance model, in which a maximum number of simultaneous connections is large, in order to reduce the waiting time, cost rises.

In documents 1 and 2, radio base stations or system control devices prevent mutual interference among access points.

As described above, when the CFP in which the radio communication system performs allocation control for a transmission right and the CP in which the radio communication system does not perform the allocation control are defined, documents 1 and 2 do not take into account a period for control for sequentially allocating a transmission right from the radio communication system to the respective radio communication terminals.

SUMMARY OF THE INVENTION

The present invention has been devised in view of such a situation and it is an objective of the present invention to provide a radio communication system, a radio base station, a radio communication method, and a program for the radio communication system that increase, even while control for allocating a transmission right from the radio communication system to respective radio communication terminals is not performed, a maximum number of simultaneous connections within a communication capacity range of a frequency set in advance, reduce a waiting time in radio communication, and increase speed of communication without causing an increase in cost for addition of radio base stations, replacement with a high-performance model, and the like.

In order to attain the exemplary objective, a radio communication system according to a first aspect of the present embodiments is a radio communication system including a plurality of radio base stations that control radio communication connection with radio communication terminals, and a system control device that performs various kinds of control of communication in the radio base stations. The radio communication system includes timing acquiring means with which a first radio base station acquires transmission and reception time frame information of transmission and reception between a radio communication terminal and a second radio base station, and schedule adjusting means for controlling the first radio base station to perform transmission to a radio communication terminal at timing that does not overlap a transmission and reception time in the second radio base station regardless of whether the radio communication system is allocating transmission rights to radio communication terminals.

It is preferable that the schedule adjusting means sets a transmission and reception time frame in the second radio base station as a communication suspended time frame in the first radio base station, and causes the first radio base station to perform transmission to a radio communication terminal avoiding the communication suspended time frame.

It is preferable that the first radio base station includes a broadcasting-information transmitting and receiving section that periodically transmits and receives broadcasting information to and from the second radio base station, and the timing acquiring means acquires transmission and reception time frame information based on transmission timing of the broadcasting information.

It is preferable that the schedule adjusting means converts transmission and reception time frame information based on transmission timing of the broadcasting information in the second radio base station into time frame information based on transmission timing of broadcasting information in the first radio base station and sets the time frame as the communication suspended time frame in the first radio base station.

It is preferable that the schedule adjusting means performs adjustment of transmission timing when the first radio base station and the second radio base station perform transmission at substantially a same communication frequency.

It is preferable that the radio base station supports a plurality of communication frequencies in radio communication with a radio communication terminal, and the transmission at substantially the same communication frequency indicates that radio communication is performed with one common communication frequency selected from a plurality of communication frequencies.

It is preferable that the radio communication between radio base stations and radio communication terminals is half duplex radio communication, and the transmission and reception time frame is a channel occupation time in the half duplex radio communication.

A radio base station according to a second aspect of the present embodiments is a radio base station that communicates with a radio communication terminal by radio. The radio base station includes a timing acquiring section with which the radio base station acquires transmission and reception time frame information of transmission and reception between a radio communication terminal and another radio base station, and a schedule adjusting section that controls the radio base station to perform transmission to a radio communication terminal at timing that does not overlap a transmission and reception time of another radio base station regardless of whether transmission right are being allocated to radio communication terminals.

It is preferable that the schedule adjusting section sets a transmission and reception time frame in another radio base station as a communication suspended time frame and performs transmission to a radio communication terminal avoiding the communication suspended time frame.

It is preferable that the radio base station includes a broadcasting-information transmitting and receiving section that periodically transmits and receives broadcasting information to and from another radio base station, and the timing acquiring section acquires transmission and reception time frame information based on transmission timing of the broadcasting information.

It is preferable that the schedule adjusting section converts transmission and reception time frame information based on transmission timing of the broadcasting information in another radio base station into time frame information based on transmission timing of broadcasting information and sets the time frame as the communication suspended time frame.

It is preferable that the schedule adjusting section performs adjustment of transmission timing when the radio base station and another radio base station perform transmission at substantially a same communication frequency.

It is preferable that the radio base station supports a plurality of communication frequencies in radio communication with a radio communication terminal, and the transmission at substantially the same communication frequency indicates that radio communication is performed with one common communication frequency selected from a plurality of communication frequencies.

It is preferable that radio communication between radio base stations and radio communication terminals is half duplex radio communication, and the transmission and reception time frame is a channel occupation time in the half duplex radio communication.

A radio communication method according to a third aspect of the present embodiments is a radio communication method in a radio communication system in which a plurality of radio base stations are connected, and the radio base stations and radio communication terminals communicate with each other by radio. The radio communication method includes a timing acquiring step in which a first radio base station acquires transmission and reception time frame information of transmission and reception between a radio communication terminal and a second radio base station, and a schedule adjusting step of controlling the first radio base station to perform transmission to a radio communication terminal at timing that does not overlap a transmission and reception time in the second radio base station acquired in the timing acquiring step. The timing acquiring step and the schedule adjusting step are performed regardless of whether the radio communication system is allocating transmission rights to radio communication terminals.

It is preferable that, in the schedule adjusting step, a transmission and reception time frame in the second radio base station acquired in the timing acquiring step is set as a communication suspended time frame in the first radio base station and the first radio base station is performs transmission to a radio communication terminal avoiding the communication suspended time frame.

It is preferable that the first radio base station periodically transmits and receives broadcasting information to and from the second radio base station and, in the timing acquiring step, transmission and reception time frame information based on transmission timing of the broadcasting information is acquired.

It is preferable that, in the schedule adjusting step, transmission and reception time frame information based on transmission timing of the broadcasting information in the second radio base station is converted into time frame information based on transmission timing of broadcasting information in the first radio base station and the time frame is set as the communication non-permission time frame in the one radio base station.

It is preferable that the schedule adjusting step is performed when the first radio base station and the second radio base station perform transmission at substantially a same communication frequency and is not performed when communication frequencies used for transmission are not substantially same.

It is preferable that the radio base station supports a plurality of communication frequencies in radio communication with a radio communication terminal, and the transmission at substantially the same communication frequency indicates that radio communication is performed with one common communication frequency selected from a plurality of communication frequencies.

It is preferable that the radio communication between radio base stations and radio communication terminals is half duplex radio communication, and the transmission and reception time frame is a channel occupation time in the half duplex radio communication.

A computer program according to a fourth aspect of the present embodiments is a program for a radio communication system in which a plurality of base stations are connected, and the radio base stations and radio communication terminals communicate with each other by radio. The computer program causes a computer to perform timing acquiring processing in which a first radio base station acquires transmission and reception time frame information of transmission and reception between a radio communication terminal and a second radio base station, and schedule adjusting processing for controlling the first radio base station to perform transmission to a radio communication terminal at timing that does not overlap a transmission and reception time in the second radio base station regardless of whether the radio communication system is allocating transmission rights to radio communication terminals.

It is preferable that, in the schedule adjusting processing, a transmission and reception time frame in the second radio base station acquired by the timing acquiring processing is set as a communication suspended time frame in the first radio base station, and the first radio base station performs transmission to a radio communication terminal avoiding the communication suspended time frame.

It is preferable that the first radio base station and the second radio base station periodically transmit and receive broadcasting information with each other and, in the timing acquiring processing, transmission and reception time frame information based on transmission timing of the broadcasting information is acquired.

It is preferable that, in the schedule adjusting processing, transmission and reception time frame information based on transmission timing of the broadcasting information in the second radio base station is converted into time frame information based on transmission timing of broadcasting information in the first radio base station, and the time frame is set as the communication suspended time frame in the first radio base station.

It is preferable that the schedule adjusting processing is executed when the first radio base station and the second radio base station perform transmission at substantially a same communication frequency and is not executed when communication frequencies used for transmission are not substantially same.

It is preferable that the radio base station supports a plurality of communication frequencies in radio communication with radio communication terminals and the transmission at substantially the same communication frequency indicates that radio communication is performed with one common communication frequency selected from a plurality of communication frequencies.

It is preferable that the radio communication between radio base stations and radio communication terminals is half duplex radio communication, and the transmission and reception time frame is a channel occupation time in the half duplex radio communication.

As described above, according to the present embodiments, it is possible to increase, even while transmission rights is not being allocated to respective radio communication terminals, a maximum number of simultaneous connections within a communication capacity range of a communication frequency set in advance, reduce a waiting time in radio communication, and increase speed of communication without causing an increase in cost for addition of radio base stations, replacement with a high-performance model, and the like.

Consequently, in the case of data communication, it is possible to improve transmission speed of data and, in the case of voice communication, it is possible to increase the number of simultaneous calls.

BRIEF DESCRIPTION OF THE DRAWINGS

The exemplary aspects and features of the present embodiments will become more apparent from the consideration of the following detailed description taken in conjunction with the accompanying drawings, in which:

FIG. 4 is a flowchart showing a communication connecting operation by the radio base station 2; and FIG. 5 is a diagram schematically showing a transmission frame in the radio communication system 100.

DESCRIPTION OF THE EXEMPLARY EMBODIMENTS

An exemplary embodiment in which a radio communication system, a radio base station, a radio communication method, and a program for the radio communication system are applied to a radio communication system that performs voice communication using a VoIP application in a wireless LAN (Local Area Network) will be explained in detail with reference to the accompanying drawings.

Figure 1:
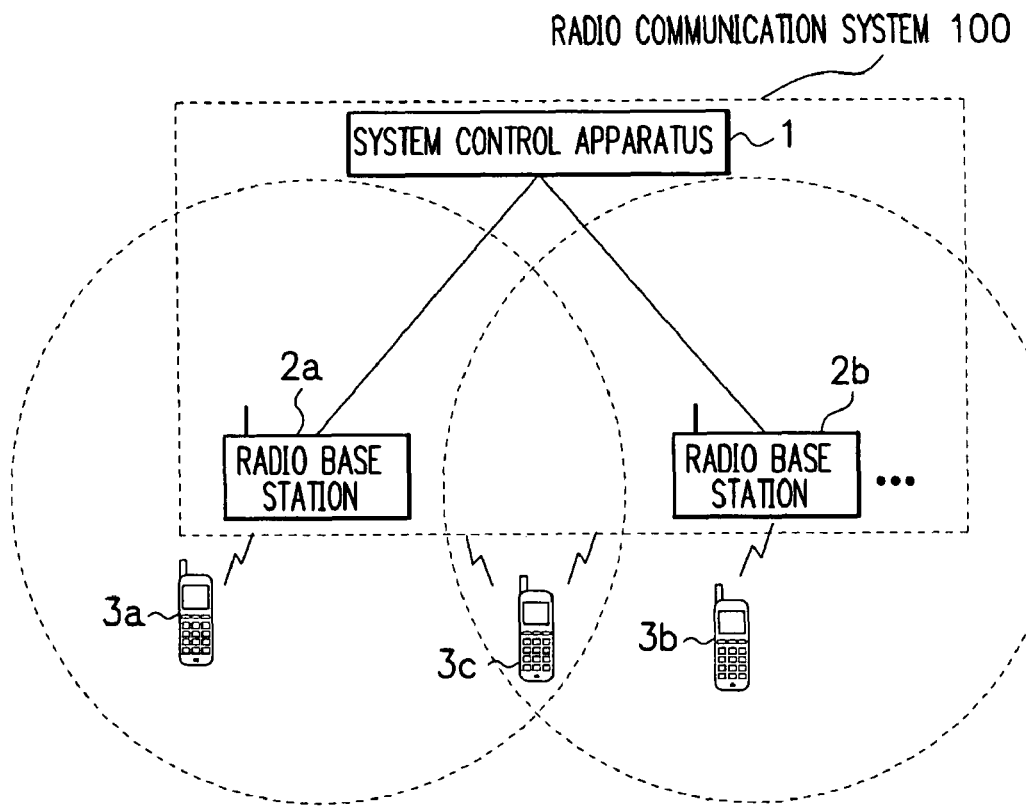
FIG. 1 is a diagram showing an example of a radio communication system 100 and radio communication terminals 3.

In a radio communication system 100, as shown in FIG. 1, radio base stations 2 (2a, 2b, . . . ) (APs: Access Points) are connected to a system control device 1 (controller), and the radio base stations 2 and radio communication terminals 3 communicate with each other by radio.

The system control device 1 performs various kinds of control of radio communication conducted by the radio base stations 2 such as handover among radio base stations 2 to perform various kinds of control of communication in the radio communication system 100.

Figure 2:
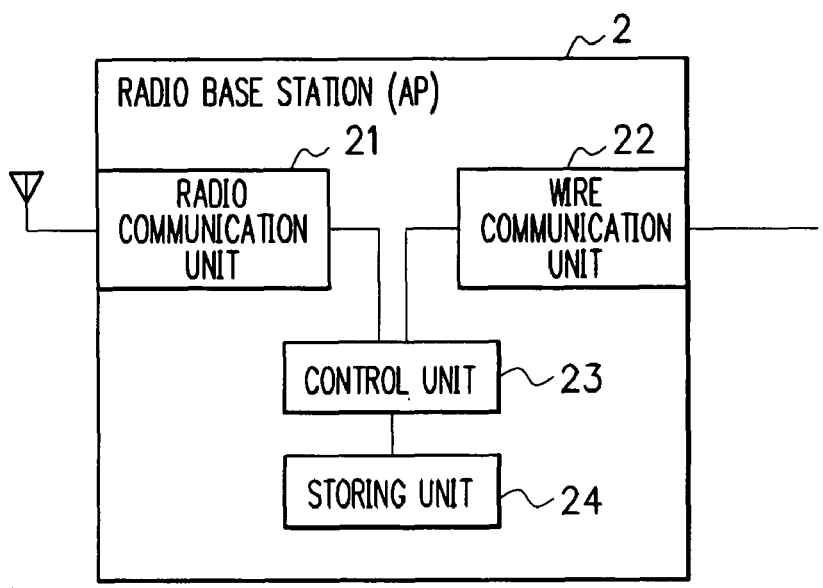
FIG. 2 is a diagram showing an example of a structure of a radio base station 2.

Each of the radio base stations 2 includes, as shown in FIG. 2, a radio communication unit 21 for performing radio communication with a radio communication terminal 3 and the like, a wire communication unit 22 for performing communication by wire with the system control device 1 and the like, a control unit 23 that controls an entire radio base station 2, and a storing unit 24.

Figure 3:
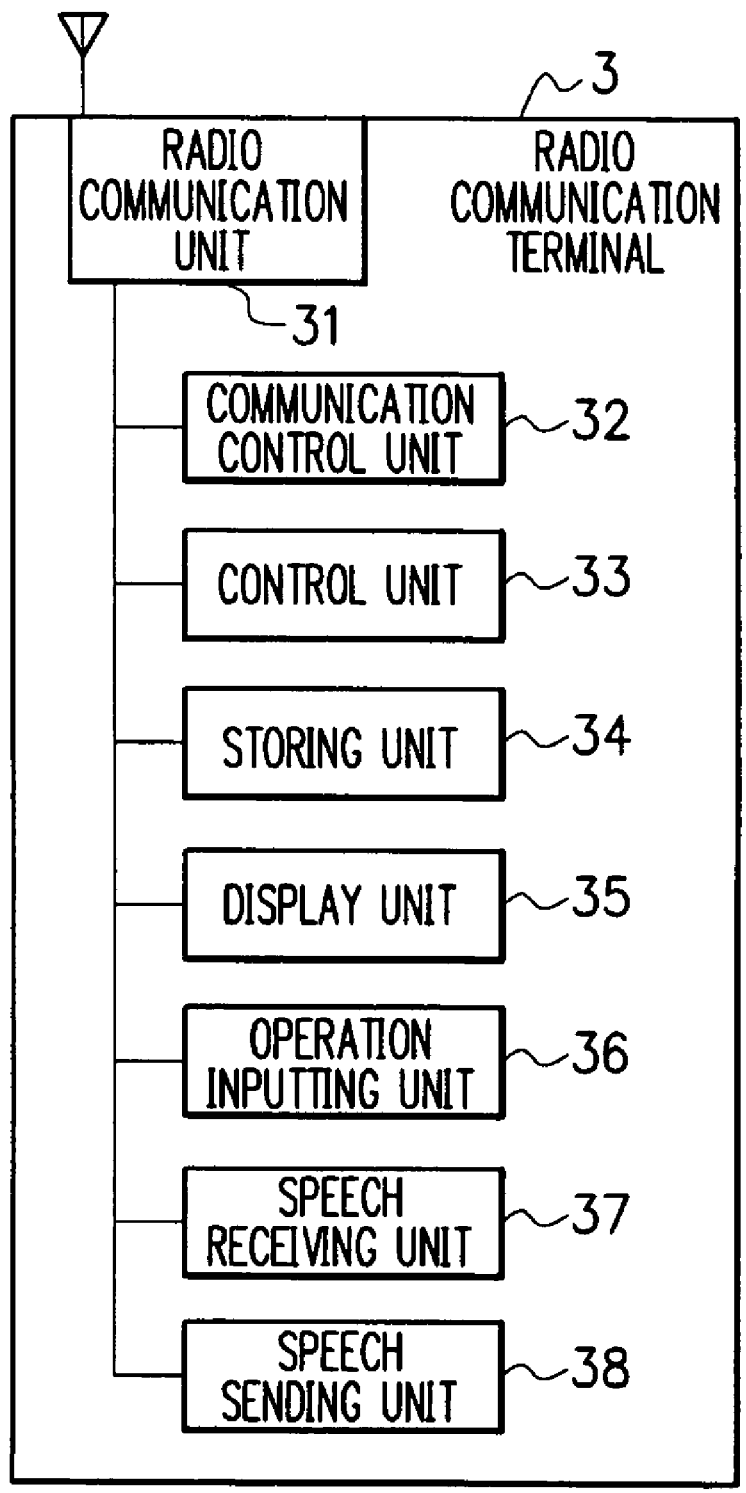
FIG. 3 is a diagram showing an example of a structure of the radio communication terminal 3.

The radio communication terminal 3 includes, as shown in FIG. 3, a radio communication unit 31 for performing radio communication with a radio base station 2 and the like, a communication control unit 32 that performs communication control for transmission power and the like of the radio communication unit 31, a control unit 33 that controls an entire radio communication terminal 3, a storing unit 34, a display unit 35 that displays various kinds of information, an operation inputting unit 36 that receives an input from a user, and a speech receiving unit 37 and a speech sending unit 38 for performing voice communication.

The radio communication system 100 performs so-called "multi-rate" communication that supports a plurality of transmission rates (communication frequencies) in radio communication between the radio base station 2 and the radio communication terminal 3.

For example, in a wireless LAN defined in the IEEE802.11b standard, four transmission rates of 11, 5.5, 2, and 1 Mbps are defined. In a wireless LAN defined in the IEEE802.11a standard, eight transmission rates of 54, 48, 36, 24, 18, 12, 9, and 6 Mbps are prescribed (54, 48, 36, 18, and 9 Mbps are options).

In the radio communication system 100, so-called "slotting" is performed in order to restrict a transmission frame from being started at arbitrary time, and perform data transmission by sectioning the data transmission in a predetermined unit of minimum time (slot).

Since radio communication is performed by slotting data transmission in each communication frequency in this way, frame transmission is performed to synchronize with slot start time, and the length of a frame is set to be the same as the length of a slot.

Consequently, even in communication using one communication frequency, it is possible to simultaneously perform radio communication between a radio base station and a plurality of terminals.

A communication connecting operation in the radio communication system 100 will be explained with reference to a flowchart in FIG. 4 using the radio base station 2a as an example.

First, the radio base station 2a receives neighbor information from another radio base station 2b adjacent to the radio base station 2a, and acquires transmission power information and transmission reception time frame information included in the neighbor information. The transmission reception time frame indicates a time frame in which the radio base station 2a performs communication with the radio communication terminal 3 (step S1).

As shown in FIG. 5, the neighbor information is transmitted periodically at timing set in advance different from the timing of beacon signals (broadcasting information) transmitted for periodical exchange of information among radio base stations 2 and is used for exchange of information not included in a beacon signal.

The transmission and reception time frame information included in the neighbor information is set on the basis of beacon transmission timing in the radio base station 2b that has originated the neighbor information. The transmission and reception time frame information indicates a channel occupation time by transmission and reception between the radio base station 2b and the radio communication terminal 3 belonging to the radio base station 2b.

The radio base station 2a acquires the beacon transmission timing of the radio base station 2b from the neighbor information and recognizes from reference time of beacon transmission of the radio base station 2a how large is the difference between the reference time of beacon transmission of the radio base station 2a and the reference time of beacon transmission of the radio base station 2b.

A transmission interval of the beacon is normally 102 msec (100 kμsec). As an example, the radio base station 2b uses a 50 msec period before transmission of beacon for transmission and reception of an RTP (Real-time Transport Protocol) to and from a terminal belonging to the radio base station 2b.

When there is a difference of 40 msec between the reference time of beacon transmission of the radio base station 2a and the reference time of beacon transmission of the radio base station 2b, the radio base station 2a uses a 50 msec period after transmission of the beacon from the radio base station 2a for transmission and reception of the RTP to and from a terminal belonging to the radio base station 2a.

In this way, the radio base station 2a calculates a guard time (communication suspended time) based on beacon transmission timing of the radio base station 2a from the difference between the reference times in beacon transmission, and the transmission and reception time frame information based on the beacon transmission timing of the radio base station 2b (step S2).

As shown in FIG. 5, the radio base station 2a sets a guard time that is a transmission and reception interval between the radio base station 2b and a radio communication terminal 3 belonging to the station 2b. Consequently, the radio base station 2a prevents overlap of a transmission and reception interval (a channel occupation time) between the radio base station 2b and the radio communication terminal 3 belonging to the radio base station 2b, with the transmission and reception timing between the radio base station 2a and the radio communication terminal 3 belonging to the radio base station 2a. The radio base station 2a calculates the guard time, based on the beacon transmission timing from the radio base station 2a, using the difference between the reference times in beacon transmission.

More specifically, the radio base station 2a converts the transmission and reception time frame information based on the beacon transmission timing between the radio base station 2b and the radio communication terminal 3 into time frame information based on the beacon transmission timing of the radio base station 2a and sets the time frame as a guard time in the radio base station 2a.

Consequently, it is possible to set a guard time based on the beacon transmission timing from the radio base station 2a with respect to each period of beacon transmission periodically performed. It is possible to set a slot avoiding the guard time as a transmission and reception time frame between the radio base station 2a and the radio communication terminal 3 with respect to each period of beacon transmission.

In this way, the radio base station 2a learns TBTT (beacon transmission timing) of the radio base station 2b from the neighbor information to determine a slot (transmission timing) used for communication with the radio communication terminal 3 belonging to the radio base station 2a not to overlap the transmission and reception time frame of transmission and reception by the radio base station 2b adjacent to the radio base station 2a.

The radio base station 2a acquires communication frequency information used in the radio base station 2b adjacent to the radio base station 2a using beacon signals transmitted and received periodically. Thus, when the radio base station 2a received a connection start request from a radio communication terminal 3a (step S3), the radio base station 2a checks whether a communication frequency used for connection with the radio communication terminal 3a is equal to a communication frequency used in the radio base station 2b adjacent to the radio base station 2a (step S4).

When the radio base station 2a performs transmission at the same communication frequency (channel) (step S4; Yes), the radio base station 2a causes the radio communication terminal 3a to make connection avoiding the guard time calculated in step S2 and performs sound data transmission and reception according to the RTP in a slot avoiding the guard time (step S5).

In a wireless network defined in the IEEE802.11 standard, a radio section is half duplex. Thus, CTS (Clear to Send) messages serving as a control frame for preventing other stations from interrupting transmission timing are transmitted and transmission and reception of voice data according to the RTP are performed in a slot avoiding the guard time.

When the radio base station 2a performs transmission at a communication frequency (channel) different from that of the radio base station 2b adjacent to the radio base station 2a (step S4; No), the radio base station 2a causes the radio communication terminal 3a to make connection at default transmission timing and performs transmission and reception of sound data according to the RTP in a slot at the default timing (step S6).

As described above, according to the embodiment of the present invention, the transmission and reception time frame information of the radio base station 2 and the radio communication terminal 3 is acquired from the neighbor information in advance to allocate time used in communication by the radio base station 2b and the radio base station 2a in the neighborhood that use the same channel. This makes it possible to prevent collision and share a channel.

More specifically, in the past, since transmission timing of respective terminals was asynchronous, collision tended to occur at the timing of frame transmission. As a result, an increase in a waiting time was caused.

To solve this problem, in this embodiment, the radio base stations 2 that use the same channel acknowledge presence of another radio base station, and one of the radio base stations 2 calculate a transmission and reception time frame of another radio base station as a guard time to negotiate transmission timing. This makes it possible to prevent collision of transmission timing of the radio base stations.

Therefore, it is possible to reduce a waiting time due to collision of transmission timing in frame transmission and increase a maximum number of calls when a common channel is shared.

Frame collision among the radio base stations 2 that share a channel is prevented as described above. Thus, in the CP in which the DCF prescribed in the IEEE802.11 wireless LAN functions, as in the CFP in which the PCF functions, it is possible to prevent the frame collision and use a channel efficiently. This makes it possible to increase speed of communication and increase a maximum number of calls when a channel is shared.

In other words, a transmission and reception interval in another radio base station acts as a guard time to avoid collision of transmission timing while a radio communication system does not allocate transmission rights to radio communication terminals like during the CP, in which the DCF operates, whereby the advantages of the embodiments are obtained.

The embodiments described above are preferred embodiments of the present invention. The present invention is not limited to the embodiments. It is possible to modify the present invention in various ways on the basis of the technical idea of the present invention and carry out the present invention.

For example, in the explanation of the embodiments, the embodiment is applied to the radio communication system that performs voice communication using VoIP applications. However, the present invention is not limited to this embodiment. It is also possible to apply the present invention to a wireless communication system that does not use an RTP such as a wireless LAN that performs only data communication.

In the explanation of the embodiment, the system control device 1 and the radio base stations 2 communicate through cables. However, a form of communication is not limited to this as long as communication is established. Wireless communication may an alternative choice.

The means and the functions of the radio base stations 2 according to the embodiments only need to be realized over the whole radio communication system 100. For example, a system control device may have the means and the functions, or the means and the functions may be realized in cooperative work between the system control device and radio base stations.

In the explanation of the embodiment, the radio base stations are connected to one system control device. However, the radio communication system is not limited to this configuration as long as it is possible to perform communication among a plurality of radio base stations. It is also possible to apply the present invention to a radio communication system in which a plurality of system control devices are connected and radio base stations are connected to the respective system control devices.

When the processing for realizing the radio communication system according to the embodiments is recorded in a recording medium as a program, it is possible to realize the functions according to the embodiments by causing a CPU of a computer constituting the system to perform the processing according to the program supplied from the recording medium.

In this case, the present invention is also applied when a group of information items including a program is supplied from a recording medium or supplied from an external recording medium via a network.

In other words, a program code itself read out from the recording medium realizes new functions of the present invention. The recording medium having the program code stored therein and signals read out from the recording medium constitute the present invention.

As the recording medium, for example, a floppy (registered trademark) disk, a hard disk, an optical disk, a magneto-optical disk, a CD-ROM, a CD-R, a magnetic tape, a non-volatile memory card, a ROM, and an EEPROM may be used.

In the program according to the present invention, it is possible to cause a radio communication system and a radio base station controlled by the program to realize the functions in the radio communication system according to the embodiments.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A radio communication system including a plurality of radio base stations that control radio communication connection with radio communication terminals, and a system control device that performs various kinds of control of communication in the radio base stations, the radio communication system comprising:
   timing acquiring means with which a first radio base station acquires transmission and reception time frame information on transmission and reception between a radio communication terminal and a second radio base station; and
   schedule adjusting means for controlling the first radio base station to perform transmission to a radio communication terminal at timing that does not overlap a transmission and reception time in the second radio base station regardless of whether the radio communication system is allocating transmission rights to radio communication terminals.

2. The radio communication system according to claim 1, wherein the schedule adjusting means sets a transmission and reception time frame in the second radio base station as a communication suspended time frame in the first radio base station, and causes the first radio base station to perform transmission to a radio communication terminal avoiding the communication suspended time frame.

3. The radio communication system according to claim 2, wherein
   the first radio base station includes a broadcasting-information transmitting and receiving section that periodically transmits and receives broadcasting information to and from the second radio base station, and the timing acquiring means acquires transmission and reception time frame information based on transmission timing of the broadcasting information.

4. The radio communication system according to claim 3, wherein the schedule adjusting means converts transmission and reception time frame information based on transmission timing of the broadcasting information in the second radio base station into time frame information based on transmission timing of broadcasting information in the first radio base station and sets the time frame as the communication suspended time frame in the first radio base station.

5. The radio communication system according to claim 1, wherein the schedule adjusting means performs adjustment of transmission timing when the first radio base station and the second radio base station perform transmission at substantially a same communication frequency.

6. The radio communication system according to claim 5, wherein
the radio base station supports a plurality of communication frequencies in radio communication with a radio communication terminal, and
the transmission at substantially the same communication frequency indicates that radio communication is performed with one common communication frequency selected from a plurality of communication frequencies.

7. The radio communication system according to claim 1, wherein
the radio communication between radio base stations and radio communication terminals comprises half duplex radio communication, and
the transmission and reception time frame comprises a channel occupation time in the half duplex radio communication.

8. A radio base station communicating with a radio communication terminal by radio, the radio base station comprising:
a timing acquiring section with which the radio base station acquires transmission and reception time frame information of transmission and reception between a radio communication terminal and another radio base station; and
a schedule adjusting section that controls the radio base station to perform transmission to a radio communication terminal at timing that does not overlap a transmission and reception time of another radio base station regardless of whether transmission rights are being allocated to radio communication terminals.

9. The radio base station according to claim 8, wherein the schedule adjusting section sets a transmission and reception time frame in another radio base station as a communication suspended time frame and performs transmission to a radio communication terminal avoiding the communication suspended time frame.

10. The radio base station according to claim 9, further comprising a broadcasting-information transmitting and receiving section that periodically transmits and receives broadcasting information to and from another radio base station, wherein
the timing acquiring section acquires transmission and reception time frame information based on transmission timing of the broadcasting information.

11. The radio base station according to claim 10, wherein the schedule adjusting section converts transmission and reception time frame information based on transmission timing of the broadcasting information in another radio base station into time frame information based on transmission timing of broadcasting information and sets the time frame as the communication suspended time frame.

12. The radio base station according to claim 8, wherein the schedule adjusting section performs adjustment of transmission timing when the radio base station and another radio base station perform transmission at substantially a same communication frequency.

13. The radio base station according to claim 12, wherein
the radio base station supports a plurality of communication frequencies in radio communication with a radio communication terminal, and
the transmission at substantially the same communication frequency indicates that radio communication is performed with one common communication frequency selected from a plurality of communication frequencies.

14. The radio base station according to claim 8, wherein
radio communication between radio base stations and radio communication terminals comprises half duplex radio communication, and
the transmission and reception time frame comprises a channel occupation time in the half duplex radio communication.

15. A radio communication method for a radio communication system in which a plurality of radio base stations are connected, and the radio base stations and radio communication terminals communicate with each other by radio, the radio communication method comprising:
a timing acquiring step in which a first radio base station acquires transmission and reception time frame information of transmission and reception between a radio communication terminal and a second radio base station; and
a schedule adjusting step of controlling the first radio base station to perform transmission to a radio communication terminal at timing that does not overlap a transmission and reception time in the second radio base station acquired in the timing acquiring step, wherein
the timing acquiring step and the schedule adjusting step are performed regardless of whether the radio communication system comprises allocating transmission rights to radio communication terminals.

16. The radio communication method according to claim 15, wherein, in the schedule adjusting step, a transmission and reception time frame in the second radio base station acquired in the timing acquiring step is set as a communication suspended time frame in the first radio base station, and the first radio base station performs transmission to a radio communication terminal avoiding the communication suspended time frame.

17. The radio communication method according to claim 16, wherein
the first radio base station periodically transmits and receives broadcasting information to and from the second radio base station, and
in the timing acquiring step, transmission and reception time frame information based on transmission timing of the broadcasting information is acquired.

18. The radio communication method according to claim 17, wherein, in the schedule adjusting step, transmission and reception time frame information based on transmission timing of the broadcasting information in the second radio base station is converted into time frame information based on transmission timing of broadcasting information in the first radio base station and the time frame is set as the communication suspended time frame in the first radio base station.

19. The radio communication method according to claim 15, wherein the schedule adjusting step is performed when the first radio base station and the second radio base station perform transmission at substantially a same communication frequency and is not performed when communication frequencies used for transmission are not substantially same.

20. The radio communication method according to claim 19, wherein
the radio base station supports a plurality of communication frequencies in radio communication with a radio communication terminal, and
the transmission at substantially the same communication frequency indicates that radio communication is performed with one common communication frequency selected from a plurality of communication frequencies.

21. The radio communication method according to claim 15, wherein
the radio communication between radio base stations and radio communication terminals comprises half duplex radio communication, and
the transmission and reception time frame comprises a channel occupation time in the half duplex radio communication.

22. A non-transitory computer readable medium storing a computer program for a radio communication system in which a plurality of base stations are connected, and the radio base stations and radio communication terminals communicates with each other by radio, the program causing a computer to perform the following:
timing acquiring processing in which a first radio base station acquires transmission and reception time frame information of transmission and reception between a radio communication terminal and a second base station; and
schedule adjusting processing for controlling the first radio base station to perform transmission to a radio communication terminal at timing that does not overlap a transmission and reception time in the second radio base station regardless of whether the radio communication system is allocating transmission rights to radio communication terminals.

23. The non-transitory computer readable medium storing a computer program for a radio communication system according to claim 22, wherein, in the schedule adjusting processing, a transmission and reception time frame in the second radio base station acquired by the timing acquiring processing is set as a communication suspended time frame in the first radio base station, and the first radio base station performs transmission to a radio communication terminal avoiding the communication suspended time frame.

24. The non-transitory computer readable medium storing a computer program for a radio communication system according to claim 23, wherein
the first radio base station and the second radio base station periodically transmit and receive broadcasting information with each other, and
in the timing acquiring processing, transmission and reception time frame information based on transmission timing of the broadcasting information is acquired.

25. The non-transitory computer readable medium storing a computer program for a radio communication system according to claim 24, wherein, in the schedule adjusting processing, transmission and reception time frame information based on transmission timing of the broadcasting information in the second radio base station is converted into time frame information based on transmission timing of broadcasting information in the first radio base station, and the time frame is set as the communication suspended time frame in the first radio base station.

26. The non-transitory computer readable medium storing a computer program for a radio communication system for a radio communication system according to claim 22, wherein the schedule adjusting processing is executed when the first radio base station and the second radio base station perform transmission at substantially a same communication frequency and is not executed when communication frequencies used for transmission are not substantially same.

27. The non-transitory computer readable medium storing a computer program for a radio communication system for a radio communication system according to claim 26, wherein
the radio base station supports a plurality of communication frequencies in radio communication with radio communication terminals, and
the transmission at substantially the same communication frequency indicates that radio communication is performed with one common communication frequency selected from a plurality of communication frequencies.

28. The non-transitory computer readable medium storing a computer program for a radio communication system for a radio communication system according to claim 22, wherein
the radio communication between radio base stations and radio communication terminals comprises half duplex radio communication, and
the transmission and reception time frame comprises a channel occupation time in the half duplex radio communication.

* * * * *